Feb. 21, 1961 R. W. FRITTS ET AL 2,972,654

THERMOELECTRIC GENERATOR

Filed Nov. 24, 1953

INVENTORS
Robert W. Fritts
Sebastian Karrer
By Brown, Jackson, Boettcher & Dienner
Attorneys 2,972,654
Patented Feb. 21, 1961

2,972,654

THERMOELECTRIC GENERATOR

Robert W. Fritts, Elm Grove, Wis., and Sebastian Karrer, Port Republic, Md., assignors, by mesne assignments, to Minnesota Mining and Manufacturing Company, St. Paul, Minn., a corporation of Delaware Filed Nov. 24, 1953, Ser. No. 394,073

10 Claims. (Cl. 136—4)

This invention relates to thermoelectric generators, and more particularly, thermocouples wherein at least one element is a semi-metallic alloy. A "semi-metallic alloy," as the term is used throughout this specification and in the appended claims, is to be understood as meaning an alloy having lower mechanical strength than that ordinarily exhibited by metal, and whose composition is chemically reactive, especially at elevated temperatures, requiring isolation from substances having deleterious affinity therefor. Such alloys are further characterized by having high thermoelectric power with respect to a metal, low resistivity (the temperature coefficient of which is positive) and low thermal conductivity with respect to a metal. Examples of such "semi-metallic alloys" are certain lead and tellurium, lead and selenium, and the lead and selenium-tellurium alloys. Other examples of "semi-metallic alloys" are the zinc-antimony alloys described in U.S. Patents Nos. 2,229,482 and 2,366,881 to Telkes, the copper-silver-selenium alloys described in U.S. Patent No. 2,232,960 to Milnes, the copper-silver-tellurium-selenium-sulphur alloys described in U.S. Patent No. 2,397,756 to Schwarz, and the silver-tellurium alloys described in U.S. Patent No. 2,602,095 to Faus.

Utilization of the semi-metallic alloys aforeindicated as elements of thermocouples presents problems not ordinarily encountered in the use, for example, of metallic thermocouple elements, which problems result from the characteristic physical and chemical differences between metallic elements and the semi-metallic elements aforementioned. Utilization of such elements as thermocouple elements of necessity subjects the element to high temperatures and to large temperature changes, which would quickly destroy such elements if treated in the same manner as metallic elements, since at elevated temperatures semi-metallic elements of the type under consideration oxidize rapidly and suffer undesirable changes of electrical properties. Moreover, the mechanical strength of such semi-metallic elements is such that they are able to withstand only small tensile or shearing stresses, although mild compressive loads can be supported indefinitely. Accordingly, the thermal expansion of the semi-metallic thermoelectric element and that of its mounting should be matched as nearly as possible and any mismatch therebetween be resolved as a compressive load upon the semi-metallic element within the elastic limit thereof.

The foregoing mechanical and chemical limitations impose stringent requirements for any mounting of such semi-metallic elements that are intended to extract thermal energy from a source of heat for an extended period of time.

Accordingly, among the objects of the present invention are the provision of mountings and thermocouple assemblies for thermocouple elements of semi-metallic alloys of the type afore indicated which afford the following:

(1) Disposition of the element in an inert atmosphere and hermetic sealing of the element from oxygen and other deleterious gases for the lifetime of the unit.

(2) Isolation of the element from any external shock or mechanical forces.

(3) Minimization of the thermal expansion differential between the element and its mounting such that any residual forces resulting from a thermal expansion differential between the two will be compressive in nature with respect to the element, and will fall within the elastic limit of the element.

(4) Efficient heat transfer through the assembly and particularly the electrical connections comprising the hot and cold junctions thereof to afford maximum conversion efficiency.

(5) Provision of means for cooling the cold junctions of the assemblies to afford high conversion efficiency.

Another object of the invention is to provide a thermocouple assembly affording the aforementioned characteristics, and more specifically providing hermetic sealing of the semi-metallic thermocouple element enabling the assembly to be utilized for high temperature applications.

Another and more specific object of the invention is to provide a thermocouple assembly of the aforementioned character in which the mismatch in thermal expansion between the thermocouple elements is substantially neutralized and in which a glass hermetic seal is provided for protection of the semi-metallic thermocouple element from ambient atmosphere.

Other objects and advantages will hereinafter appear or become apparent from the following description, it being understood that the embodiment of the drawings is illustrative only.

Figure 1:
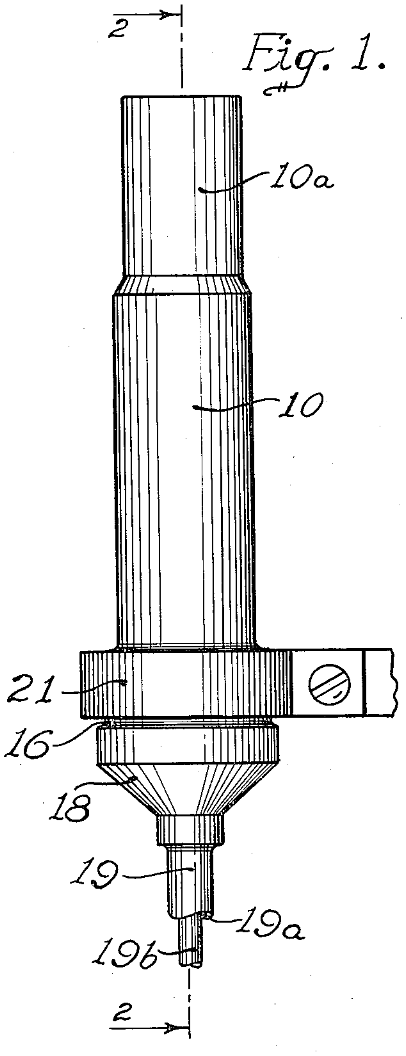
Figure 1 is an elevational view of one form of thermoelectric generator assembly constructed in accordance with the teachings of the present invention.

We have shown a thermoelectric generator, comprising a pair of thermocouple element means 10 and 11. The thermocouple element means 10 in the illustrated embodiment of our invention comprises a generally cup-shaped member, preferably of stainless steel, having a hollow tubular sleeve or sheath portion **10*b*, which serves as the outer element of the assembly, and a tip portion 10*a* which, as shown, may be conveniently formed integrally at one end of the sleeve or sheath portion, hermetically sealing or closing the latter at that end, and serving as a heat probe element means for the assembly. The thermocouple element means 10 and 11 are mechanically and electrically joined at one end only as through a contact electrode 12, to be hereinafter described, to provide a hot junction for the thermocouple. Where the thermocouple element means 10 is of stainless steel or of an iron alloy the contact electrode 12 may, if desired, be formed as an integral part of the element 10 in which case the element 11 is joined thereto by the fusion method of contacting hereinafter referred to. The element 11 in the assembly aforedescribed is the negative element of the couple, while the stainless steel sheath 10 serves both to enclose the element 11 and the hot junction, as well as to function as the positive member of the couple when the couple is heated at the hot junction. The thermal voltages developed in the elements 10 and 11 are of opposite sign (relative to platinum) with respect to the temperature gradient and hence are additive in a series circuit formed between a cold junction pin 14, connected to and forming part of a contact electrode 13, and the cold end of the sheath. The voltage developed in the sheath is small by comparison to that of the element 11**, wherefore the latter, for purposes of this specification, is denominated the "active" element.

The "active" element 11 may, as aforementioned, be, for example, of a lead and selenium-tellurium alloy. Such an element comprises lead and selenium-tellurium constituents melted together at from about 1688 degrees Fahrenheit to 1953 degrees Fahrenheit, depending upon the proportions of selenium and tellurium constituents, preferably in a reducing atmosphere and cast into the desired shape, after which it is preferably annealed at from 1200 degrees Fahrenheit to 1500 degrees Fahrenheit for from ten to twenty hours. The element 11 is further to be understood, in this instance, as consisting of lead and selenium-telurium constituents, the selenium-tellurium constituent varying linearly in percent by weight of the element with the atomic proportions of selenium and tellurium in said selenium-tellurium constituent, the selenium-tellurium constituent ranging from a minimum of 25 percent and a maximum of 27.55 percent when tellurium is but a trace in selenium, to a minimum of 35 percent and a maximum of 38.05 percent when selenium is but a trace in tellurium, the balance of the element in each instance being substantially all lead. The element 11 aforementioned is also, in this instance, to be understood as containing metallic impurity not exceeding the order of 0.01 percent and to be substantially oxygen free. Further details with respect to the composition of element 11 may be found in the copending application of Sebastian Karrer, Serial No. 392,648, filed November 17, 1953, now abandoned.

Elements of the character aforedescribed, as previously pointed out, have particular utility as an element for thermoelectric conversion of heat to electrical energy. For example, an element in which the lead constituent is 63 percent by weight, remainder substantially all tellurium with but a trace of selenium, exhibits a thermoelectric power of —270 microvolts per degree centigrade against copper, and a resistivity of .001 ohm-cm. at room temperature.

From the foregoing it may be observed that the assembly described may be characterized as the combination of a semi-metallic inner element and a stainless steel outer element forming a thermocouple that exhibits the high conversion efficiency of the semi-metallic alloy, and simultaneously, the mechanical strength and chemical inertness of the stainless steel element, provided, of course, the element 11 is hermetically sealed and mounted, as will hereinafter be more fully described.

Mechanical and electrical contact between the outer element or sheath 10 and the active element 11 at the hot junction, and electrical connection at the cold junction end of the element 11, is made over a substantial area through contact electrodes 12 and 13, respectively. Such contact electrodes provide contacts of low thermal and electric resistance, and are chemically stable with respect to the active element 11. Iron is especially adapted for such contact electrodes with the lead and selenium-tellurium active element 11 aforedescribed. These contact electrodes may be of the type more fully described in the copending application of Russell E. Fredrick, Robert W. Fritts and William V. Huck, Serial No. 366,238, filed July 6, 1953, now abandoned.

Such contact electrodes 12 and 13 may be of either a pressure or bonded type. In the latter case the element-electrode interface should have a mechanical strength at least comparable to that of the semi-metallic alloy of the element 11. More specifically, the contact electrodes 12 and 13 may be bonded to the active element 11 by either the "direct casting" or "fusion" method, more fully hereinafter described. If the "direct casting" method is utilized, the iron of the electrode is preferably stabilized in the alpha phase by addition of one or more known alpha-phase stabilizers. A preferred stabilizer for this purpose is, however, molybdenum in amount of from 2.7 percent to 7 percent by weight of the iron.

If the "fusion" method of contacting the element 11 is utilized, the iron of the electrode may be stabilized in the gamma phase, alpha phase or unstabilized. Whether the "direct casting" or "fusion" method is utilized, it is important, however, that iron diffuse into the active element 11 during the contacting procedure in amount no more than 0.5 percent by weight of the element lest the thermoelectric power and electrical resistivity of the element 11 be reduced more than 10 percent.

As aforementioned, the thermocouple element means 10 and 11 are joined to form an electrical connection at the hot junction only, the element 11 being spaced throughout the remainder of its length from the sheath 10. This space, best illustrated at 15 in Figure 2, serves to insulate electrically the elements from each other, and is preferably filled with an inert atmosphere to prevent oxidation of the active element 11. The sheath 10 is provided with an extension in the form of a collar 16, preferably of brass, which is brazed or otherwise attached to the open end of the sheath, and providing the assembly an outer cold junction. A support means 21 surrounding collar 16 provides for attachment of the thermocouple assembly to the apparatus with which it is used and, as will appear, serves in dissipating heat at the cold junctions of the assembly.

Figure 2:
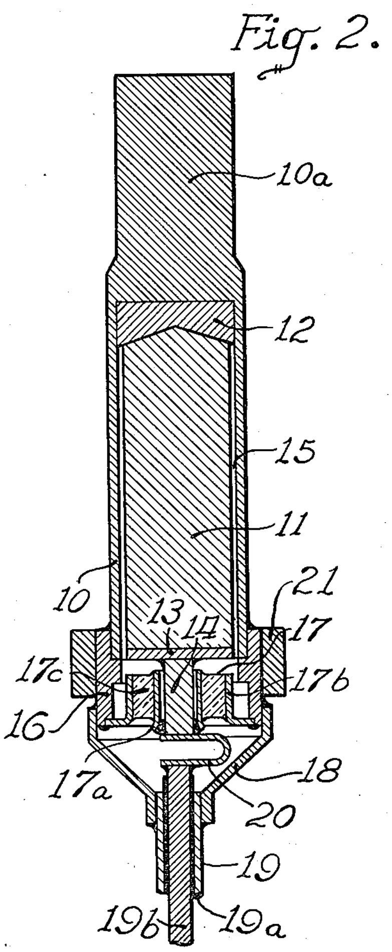
Figure 2 is a sectional view taken on the line 2—2 of Figure 1.
Figure 3:
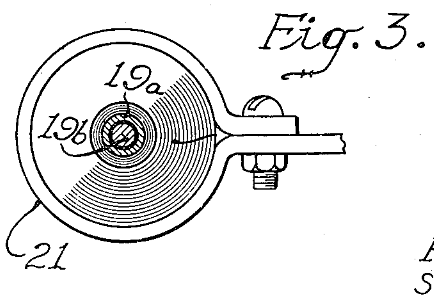
Figure 3 is an end elevational view of the assembly illustrated in Figures 1 and 2.

Sealing means in the form of a glass and metal seal is provided to seal the space 15 from ambient atmosphere and comprises a first sleeve member 17*a*, of configuration best shown in Figure 2, sealingly attached to the cold junction pin 14, a second sleeve member 17*b* suitably connected to the collar 16, and an annular glass seal 17*c* bonded to the outer and inner surfaces of the sleeve members 17*a* and 17*b*, respectively, thereby hermetically sealing the element 11 within the sheath member 10. The seal 17 aforedescribed provides the tightest seal possible and one which will withstand the very high temperatures to which the assembly might be subjected.

Ideally the thermal expansion of the element 11 and the stainless steel case 10 should match and this characteristic may be substantially achieved by fabricating the element 11, case 10, and its extension 16 of dimensions and materials to that end. However, exact matching of differential thermal expansion under all operating conditions is impossible and unnecessary for despite the weak tensile strength of these semi-metallic alloys they can withstand mild compressive loads and will respond to such stresses within their elastic limits, which are of the order of 1000 p.s.i. at room temperature. For example, an element 11 of certain lead and selenium-tellurium alloy composition (whose coefficient of thermal expansion is approximately $18\times10^{-6}/°$ C.) substantially matches that of an austenitic stainless steel case 10 (whose thermal expansion coefficient is approximately $18\times10^{-6}/°$ C.).

The sheath or case 10, its extension 16, and seal 17, in the form of our invention herein disclosed, define a mounting means for the inner or semi-metallic thermocouple element means 11. It will be understood that thermal expansion (which, as is known, is a function of the length and coefficient of expansion of a material for any given temperature distribution) of the case 10 and its extension 16, on the one hand, and that of the active element 11 on the other hand, are such that when the hot junction of the generator is heated, the total thermal expansion of active element 11 is at least as great as that of the mounting means, whereby any residual greater thermal expansion of the active element 11 with respect to its mounting is resolved in compression of the active element 11 in the mounting.

The embodiment illustrated further comprises a funnel-shaped bracket member 18 suitably connected to the outer end of the collar 16 which serves to establish an electrical connection to the outer or positive member 19*a* of a coaxial lead 19 of the general type disclosed in the patent to O. J. Leins, No. 2,126,564, issued August 9, 1938, thereby providing electrical connection therebetween. The inner or negative terminal 19b of the lead 19 is electrically connected to the cold junction pin 14 (and hence the inner element 11) through a flexible electrical connector such as member 20, preferably of copper for low thermal and electrical resistance, of U-shaped configuration as best shown in Figure 2. The flexible electrical connector 20 thus extends between the lead 19b and cold junction pin 14 and affords means for isolating the contact electrode 13 and active element 11 from external forces which might be applied to lead 19.

The whole assembly aforedescribed is preferably of cylindrical symmetry to facilitate the fabrication of parts on automatic machines, and the integrally formed cup-shaped case 10 is preferred to avoid any influx of oxygen that might take place through a weld, which might be imperfect, located in the hot zone.

Since, as is well known in the art, the electrical and thermal resistance of the unit are dependent upon the configuration thereof, as well as the electrical and thermal conductivities of the elements 10 and 11, a relationship between the dimensions of each element can be obtained which affords the highest thermal conversion efficiency in such a mounting or assembly. For elements of any given electrical and thermal conductivities the conversion efficiency depends strongly on the ratio of thickness of the sheath 10 to radius of the element 11. Therefore, with thermocouples of the character aforedescribed, in which the thermal conductivity of the semi-metallic alloy element 11 is low as compared to that of the metallic sheath 10 (for example .02 w./cm./° C. as compared to .261 w./cm./° C.), it is desirable not only that the radius of the element 11 be large with respect to the thickness of the sheath 10, for example of the order of 10 to 1.

As already mentioned, means may additionally be provided for dissipation of heat at the cold junctions in the form of support means 21 for the thermocouple assembly. As regards the inner cold junction pin, heat is dissipated through the space 15 to the sheath 10 by radiation as well as by conduction through the cold junction electrode 14, flexible connection 20 and thermocouple lead 19b. Thus, the electrical junctions between the elements are disposed so as to provide efficient heat transfer through the element and to afford high conversion efficiency. It is understood, of course, that the conversion efficiency of a thermocouple is approximately proportional to the difference between the hot and cold junction temperatures. Thus, in the interest of high conversion efficiency, it is desirable to operate any thermocouple with as high a temperature difference as possible between the junctions.

The method of assembling the thermocouple units aforedescribed is as follows:

The active element 11 is first assembled to the contact electrode 13 by either the "direct casting" or "fusion" method. In the "direct casting" method alpha-stabilized iron is placed in a mold, preferably of graphite, and the semi-metallic alloy aforementioned in chunk or granular form is also placed therein in contiguous engagement with the iron. The mold is then heated, preferably in a reducing atmosphere, to the melting point of the semi-metallic alloy; that is, within the temperature range of 1700 degrees Fahrenheit to 2000 degrees Fahrenheit, for a short interval of time to produce limited alloying between the iron and the semi-metallic alloy. The mold is then cooled causing the molten semi-metallic alloy to solidify as an ingot firmly bonded to the iron electrode.

Alternatively, as indicated, a semi-metallic element 11, preformed, as aforedescribed, may be bonded to the contact electrode 13 of iron by the "fusion" method. This method comprises heating the iron of the contact electrode to a temperature of from 1350 degrees Fahrenheit to 1660 degrees Fahrenheit to permit migration of the iron into the semi-metallic element to form a thin layer of an alloy thereof having a melting point below the phase transformation temperature of the iron, and immediately fusing said layer and the electrode to provide the bond between the element and the electrode. In this method the iron need not be alpha-stabilized, but may be unstabilized or even gamma-phase stabilized. The cold junction pin 14 is then suitably attached, as for example, by soldering, to the contact electrode 13.

The subassembly aforedescribed is then preferably annealed at from about 1050 degrees Fahrenheit to 1250 degrees Fahrenheit for from ten to twenty hours in an inert or reducing atmosphere to render the composition more homogeneous.

The annealed subassembly is then inserted into the open end of the sheath member 10, which has been machined to proper dimensions, and to the bottom of which has been butt welded the contact electrode 12 (if not integral with element 10 as aforedescribed), forming the hot junction electrode, as shown in Figure 2, the collar 16 having been previously attached to the cold end of the sheath 10 as aforedescribed. The glass seal sleeve 17b is then sealingly attached to the collar 16, and the seal between the sleeve 17a and cold junction pin 14 is made. Finally the subassembly comprising the bracket 18 and coaxial lead 19 is affixed to the collar 16 as aforedescribed.

After insertion of the active element into the sheath 10, as aforementioned, the tapered end of the element 11 may then be fused to the contact electrode 12 by the "fusion" method aforedescribed, it being understood that this step is taken under a reducing atmosphere. During this step heating should be effected locally at the hot junction to avoid damaging the assembly at the cold junctions.

With completion of the assembly of the thermocouple unit aforedescribed, the unit is now ready to be connected to an external circuit and placed in operation.

We claim:

1. A thermoelectric generator comprising, a pair of elongated spaced apart thermocouple element means, at least one of which is a semi-metallic alloy, connected at portions thereof to provide a hot junction, said thermocouple element means having substantially matching linear thermal expansion upon heating of said hot junction whereby said thermocouple element means maintain substantially the same lengths relative to each other, and means associated with said thermocouple element means substantially matching the linear thermal expansion of the latter for hermetically sealing said semi-metallic thermocouple element means from ambient atmosphere.

2. A thermoelectric generator comprising, a pair of elongated spaced apart thermocouple element means, at least one of which is a semi-metallic alloy, connected at portions thereof to provide a hot junction, said thermocouple element means having substantially matching coefficients of thermal expansion to prevent substantial variation in lengths of said thermocouple element means with respect to each other upon temperature changes, cold junction means for said thermocouple element means, and means having connection with the cold junction means of at least one of said thermocouple element means for affording transfer of heat therefrom.

3. A thermoelectric generator comprising, a pair of elongated spaced apart thermocouple element means, at least one of which is a semi-metallic alloy, connected at portions thereof to provide a hot junction, said thermocouple element means having substantially matching coefficients of expansion whereby said thermocouple element means maintain substantially the same lengths relative to each other, connections to said thermocouple element means forming cold junction means therewith, and sealing means adjacent said cold junction means capable of withstanding high temperatures for shielding said semi-metallic alloy thermocouple element means from ambient atmosphere, said sealing means substantial matching the linear thermal expansion of said thermocouple element means.

4. A thermoelectric generator comprising, a pair of elongated spaced apart thermocouple element means, at least one of which is a semi-metallic alloy, connected at portions thereof to provide a hot junction, said thermocouple element means having substantially matching coefficients of thermal expansion and being of such length that the total thermal expansion of said semi-metallic thermocouple element means is at least as great as that of the other of said pair of thermocouple element means, and means effective to resolve any difference in total linear thermal expansion between said thermocouple element means resulting from heating of said hot junction into endwise compressive force upon said semi-metallic thermocouple element means.

5. A thermoelectric generator comprising, a pair of elongated spaced apart thermocouple element means, at least one of which is a semi-metallic alloy, connected at portions thereof to provide a hot junction, said thermocouple element means having substantially matching coefficients of thermal expansion to prevent substantial variation in lengths of said thermocouple element means with respect to each other upon temperature changes, cold junction means for said semi-metallic thermocouple element means, means including the other of said thermocouple element means substantially matching the linear thermal expansion of said semi-metallic thermocouple element means for hermetically sealing the latter and means having electrical connection with said cold junction means for affording heat transfer through said semi-metallic alloy thermocouple element means, and including a flexible electrical connector for isolating said semi-metallic alloy thermocouple element means from external shock therethrough.

6. A thermoelectric generator comprising, a pair of elongated spaced apart thermocouple element means, at least one of which is a semi-metallic alloy, contact means connecting portions of said thermocouple element means to each other to provide a hot junction, said thermocouple element means having substantially matching coefficients of thermal expansion to prevent substantial variation in lengths of said thermocouple element means with respect to each other upon temperature changes, means for hermetically sealing said semi-metallic thermocouple element means substantially matching the linear thermal expansion of the latter, first cold junction means for said semi-metallic alloy thermocouple elements means, second cold junction means for the other of said thermocouple element means, means having electrical connection with said first cold junction means affording heat transfer through said semi-metallic thermocouple element means and including a flexible electrical connector isolating said semi-metallic thermocouple element means from external shock therethrough, means having electrical connection with said second cold junction means for affording heat transfer through said other thermocouple element means, and support means connected to said other thermocouple element means at said second cold junction means affording transfer of heat therefrom.

7. A thermoelectric generator comprising, a pair of elongated spaced apart thermocouple element means having substantially different thermal conductivities and substantially matching coefficients of thermal expansion to prevent substantial variation in lengths of said thermocouple element means with respect to each other upon temperature changes, connected at portions thereof to provide a hot junction, the one of said pair of thermocouple element means having the lower thermal conductivity being substantially larger in cross-sectional area than the other of said pair, cold junction means for each of said thermocouple element means, and electrical connections for dissipating heat by conduction from at least one of said cold junction means.

8. A thermoelectric generator comprising, a pair of elongated spaced apart thermocouple element means having substantially different thermal conductivities and substantially matching coefficients of thermal expansion to prevent substantial variation in lengths of said thermocouple element means with respect to each other upon temperature changes, connected at portions thereof to provide a hot junction, the one of said pair of thermocouple element means having the lower thermal conductivity being substantially larger in cross-sectional area than the other of said pair, cold junction means for each of said thermocouple element means, and electrical connections for dissipating heat by conduction from at least one of said cold junction means, and support means connected to the other of said pair of thermocouple element means affording heat transfer therethrough.

9. An encapsulated thermoelectric generator comprising, an elongated semi-metallic alloy thermocouple element, mounting means for and enclosing said semi-metallic thermocouple element including a metallic thermocouple element attached thereto to form a hot junction therewith, and said mounting means including means for hermetically sealing said semi-metallic thermocouple element from ambient atmosphere, said mounting means having a total thermal expansion no greater than that of said semi-metallic thermocouple element to prevent substantial variation in lengths of said mounting means and said semi-metallic thermocouple element when heated, whereby any difference in total thermal expansion of said semi-metallic thermocouple element with respect to said mounting means results in endwise compression of said semi-metallic thermocouple element.

10. An encapsulated thermoelectric generator comprising, an outer elongated tubular metallic thermocouple element having an opening therein, an elongated semi-metallic inner thermocouple element disposed within said outer thermocouple element and connected at one end thereto to afford a hot junction, means for closing the opening of said outer thermocouple element to seal said inner thermocouple element from ambient atmosphere, said inner thermocouple element having a total thermal expansion at least as great as that of said outer thermocouple element to prevent substantial variation in lengths of said inner and outer thermocouple elements with respect to each other when said hot junction is heated, whereby any difference in total thermal expansion of said thermocouple elements with respect to each other results in endwise compression ef said semi-metallic thermocouple element.

References Cited in the file of this patent

UNITED STATES PATENTS

| | | |
|---|---|---|
| 425,568 | Edelkamp | Apr. 15, 1890 |
| 461,437 | Iden | Oct. 20, 1891 |
| 511,245 | Mestern | Dec. 19, 1893 |
| 1,651,750 | Brophy | Dec. 6, 1927 |
| 1,818,221 | Huber | Aug. 11, 1931 |
| 1,992,747 | Gilliland et al. | Feb. 26, 1935 |
| 2,126,564 | Leins | Aug. 9, 1938 |
| 2,229,481 | Telkes | Jan. 21, 1941 |
| 2,229,482 | Telkes | Jan. 21, 1941 |
| 2,232,960 | Milnes | Feb. 25, 1941 |
| 2,366,881 | Telkes | Jan. 9, 1945 |
| 2,397,756 | Schwarz | Apr. 2, 1946 |
| 2,602,095 | Faus | July 1, 1952 |
| 2,626,970 | Hunrath | Jan. 27, 1953 |
| 2,698,352 | Fagg et al. | Dec. 28, 1954 |

FOREIGN PATENTS

| | | |
|---|---|---|
| 154,454 | Great Britain | Dec. 2, 1920 |